(12) United States Patent
Bryant et al.

(10) Patent No.: US 7,848,224 B2
(45) Date of Patent: *Dec. 7, 2010

(54) METHOD AND APPARATUS FOR CONSTRUCTING A REPAIR PATH FOR MULTICAST DATA

(75) Inventors: Stewart Frederick Bryant, Redhill (GB); Ian Michael Charles Shand, Cobham (GB); Toerless Eckert, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 502 days.

This patent is subject to a terminal disclaimer.

(21) Appl. No.: 11/175,805

(22) Filed: Jul. 5, 2005

(65) Prior Publication Data

US 2007/0019646 A1 Jan. 25, 2007

(51) Int. Cl.
*G01R 31/08* (2006.01)
*G06F 11/00* (2006.01)
*G08C 15/00* (2006.01)
*H04L 12/28* (2006.01)
*H04L 12/56* (2006.01)

(52) U.S. Cl. .................. 370/216; 370/217; 370/390

(58) Field of Classification Search .................. 370/216, 370/217, 389, 390, 392
See application file for complete search history.

(56) References Cited

U.S. PATENT DOCUMENTS

| | | | |
|---|---|---|---|
| 4,956,835 | A | 9/1990 | Grover et al. |
| 5,128,926 | A | 7/1992 | Perlman et al. |
| 5,243,592 | A | 9/1993 | Perlman et al. |
| 5,430,727 | A | 7/1995 | Callon |
| 5,825,772 | A | 10/1998 | Dobbins et al. |
| 5,959,968 | A | 9/1999 | Chin et al. |
| 5,999,286 | A | 12/1999 | Venkatesan |
| 6,002,674 | A | 12/1999 | Takei et al. |
| 6,018,576 | A | 1/2000 | Croslin |

(Continued)

FOREIGN PATENT DOCUMENTS

CN 1440159 A 9/2003

(Continued)

OTHER PUBLICATIONS

Wikipedia, "List of IPv4 Protocol Numbers," located on the internet at http://en.wikipedia.org/wiki/IP_protocol, retrieved on Feb. 1, 2007, 7 pages.

(Continued)

*Primary Examiner*—Chi H Pham
*Assistant Examiner*—Farah Faroul
(74) *Attorney, Agent, or Firm*—Hickman Palermo Truong & Becker LLP

(57) ABSTRACT

A method is disclosed for constructing a repair path for multicast data around a non-available component in a data communications network having as components nodes and links therebetween. The method comprises the step performed at a repairing node, of receiving from a notifying node in a network, a notification identifying the notifying node and components through which the notifying node can be reached. The method further comprises the steps of deriving, from the notification, a network repair address for use in the event of non-availability of a component identified in the notification; and constructing a repair path for multicast data for the repair address.

31 Claims, 9 Drawing Sheets

U.S. PATENT DOCUMENTS

| | | | |
|---|---|---|---|
| 6,032,194 A * | 2/2000 | Gai et al. | 709/239 |
| 6,044,075 A | 3/2000 | Le Boudec et al. | |
| 6,098,107 A | 8/2000 | Narvaez-Guarnieri et al. | |
| 6,111,257 A | 8/2000 | Shand et al. | |
| 6,128,750 A | 10/2000 | Espy et al. | |
| 6,148,410 A | 11/2000 | Basket et al. | |
| 6,185,598 B1 | 2/2001 | Farber et al. | |
| 6,243,754 B1 | 6/2001 | Guerin et al. | |
| 6,246,669 B1 | 6/2001 | Chevalier et al. | |
| 6,256,295 B1 | 7/2001 | Callon | |
| 6,295,275 B1 | 9/2001 | Croslin | |
| 6,321,271 B1 | 11/2001 | Kodialam et al. | |
| 6,343,122 B1 | 1/2002 | Andersson | |
| 6,349,091 B1 | 2/2002 | Li | |
| 6,356,546 B1 | 3/2002 | Beshai | |
| 6,363,319 B1 | 3/2002 | Hsu | |
| 6,389,764 B1 | 5/2002 | Stubler et al. | |
| 6,473,421 B1 | 10/2002 | Tappan | |
| 6,507,577 B1 | 1/2003 | Mauger et al. | |
| 6,578,086 B1 | 6/2003 | Regan et al. | |
| 6,654,361 B1 | 11/2003 | Dommety et al. | |
| 6,690,671 B1 | 2/2004 | Anbiah et al. | |
| 6,697,325 B1 | 2/2004 | Cain | |
| 6,697,333 B1 | 2/2004 | Bawa | |
| 6,704,320 B1 | 3/2004 | Narvaez et al. | |
| 6,711,125 B1 | 3/2004 | Walrand et al. | |
| 6,714,551 B1 | 3/2004 | Le-Ngoc | |
| 6,718,382 B1 | 4/2004 | Li et al. | |
| 6,724,722 B1 | 4/2004 | Wang | |
| 6,744,727 B2 | 6/2004 | Liu et al. | |
| 6,778,531 B1 * | 8/2004 | Kodialam et al. | 370/390 |
| 6,829,215 B2 | 12/2004 | Tornar | |
| 6,928,484 B1 | 8/2005 | Huai et al. | |
| 6,944,131 B2 | 9/2005 | Beshai et al. | |
| 6,950,870 B2 | 9/2005 | Beaulieu | |
| 6,982,951 B2 | 1/2006 | Doverspike et al. | |
| 6,987,727 B2 | 1/2006 | Fredette et al. | |
| 6,990,068 B1 | 1/2006 | Saleh et al. | |
| 6,993,593 B2 | 1/2006 | Iwata | |
| 6,996,065 B2 | 2/2006 | Kodialam et al. | |
| 7,058,016 B1 | 6/2006 | Harper | |
| 7,099,286 B1 | 8/2006 | Swallow | |
| 7,113,481 B2 | 9/2006 | Elie-Dit-Cosaque et al. | |
| 7,158,486 B2 | 1/2007 | Rhodes | |
| 7,177,295 B1 | 2/2007 | Sholander et al. | |
| 7,242,664 B2 | 7/2007 | Einstein et al. | |
| 7,260,645 B2 | 8/2007 | Bays | |
| 7,274,654 B2 | 9/2007 | Yang et al. | |
| 7,274,658 B2 | 9/2007 | Bornstein et al. | |
| 7,349,427 B1 | 3/2008 | Canning et al. | |
| 7,420,989 B2 * | 9/2008 | Liu et al. | 370/468 |
| 7,490,165 B1 | 2/2009 | Katukam et al. | |
| 7,500,013 B2 | 3/2009 | Dziong et al. | |
| 7,519,009 B2 | 4/2009 | Fleischman | |
| 2002/0021671 A1 | 2/2002 | Quinlan | |
| 2002/0037010 A1 | 3/2002 | Yamauchi | |
| 2002/0062388 A1 | 5/2002 | Ogier et al. | |
| 2002/0093954 A1 * | 7/2002 | Weil et al. | 370/389 |
| 2002/0112072 A1 | 8/2002 | Jain | |
| 2002/0116669 A1 | 8/2002 | Jain | |
| 2002/0131362 A1 | 9/2002 | Callon | |
| 2002/0136223 A1 | 9/2002 | Ho | |
| 2002/0171886 A1 | 11/2002 | Wu et al. | |
| 2002/0172157 A1 | 11/2002 | Rhodes | |
| 2003/0007500 A1 | 1/2003 | Rombeaut et al. | |
| 2003/0063613 A1 | 4/2003 | Carpini et al. | |
| 2003/0079040 A1 * | 4/2003 | Jain et al. | 709/238 |
| 2003/0110287 A1 | 6/2003 | Mattson | |
| 2003/0117950 A1 * | 6/2003 | Huang | 370/220 |
| 2003/0123457 A1 | 7/2003 | Koppol | |
| 2003/0161338 A1 | 8/2003 | Ng | |
| 2003/0193958 A1 * | 10/2003 | Narayanan | 370/400 |
| 2003/0193959 A1 | 10/2003 | Lui et al. | |
| 2003/0202473 A1 | 10/2003 | Patrick et al. | |
| 2003/0210705 A1 | 11/2003 | Seddigh et al. | |
| 2003/0233595 A1 | 12/2003 | Charny et al. | |
| 2004/0001497 A1 | 1/2004 | Sharma | |
| 2004/0001508 A1 | 1/2004 | Zheng et al. | |
| 2004/0038671 A1 | 2/2004 | Trayford et al. | |
| 2004/0071089 A1 | 4/2004 | Bauer et al. | |
| 2004/0085894 A1 | 5/2004 | Wang et al. | |
| 2004/0088429 A1 | 5/2004 | Luo | |
| 2004/0151181 A1 | 8/2004 | Chu et al. | |
| 2004/0190454 A1 | 9/2004 | Higasiyama | |
| 2004/0205239 A1 | 10/2004 | Doshi et al. | |
| 2005/0007950 A1 * | 1/2005 | Liu | 370/221 |
| 2005/0013241 A1 * | 1/2005 | Beller et al. | 370/216 |
| 2005/0031339 A1 | 2/2005 | Qiao et al. | |
| 2005/0038909 A1 | 2/2005 | Yoshiba et al. | |
| 2005/0068968 A1 | 3/2005 | Ovadia et al. | |
| 2005/0071709 A1 * | 3/2005 | Rosenstock et al. | 714/5 |
| 2005/0073958 A1 | 4/2005 | Atlas et al. | |
| 2005/0097219 A1 | 5/2005 | Goguen et al. | |
| 2005/0201273 A1 | 9/2005 | Shimizu | |
| 2005/0201371 A1 | 9/2005 | Lauer | |
| 2005/0265228 A1 * | 12/2005 | Fredette et al. | 370/216 |
| 2006/0018253 A1 * | 1/2006 | Windisch et al. | 370/216 |
| 2006/0031482 A1 | 2/2006 | Mohan et al. | |
| 2006/0050630 A1 | 3/2006 | Kobayashi et al. | |
| 2006/0092941 A1 | 5/2006 | Kusama | |
| 2006/0140190 A1 | 6/2006 | Lee | |
| 2006/0193252 A1 | 8/2006 | Naseh et al. | |
| 2006/0221962 A1 * | 10/2006 | Previdi et al. | 370/390 |
| 2006/0291446 A1 | 12/2006 | Caldwell et al. | |
| 2007/0005784 A1 | 1/2007 | Hares et al. | |
| 2007/0011284 A1 | 1/2007 | Le Roux et al. | |
| 2007/0011351 A1 | 1/2007 | Bruno et al. | |
| 2007/0038767 A1 | 2/2007 | Miles et al. | |
| 2007/0091793 A1 | 4/2007 | Filsfils et al. | |
| 2007/0091794 A1 | 4/2007 | Filsfils et al. | |
| 2007/0091795 A1 | 4/2007 | Bonaventure et al. | |
| 2007/0291790 A1 | 12/2007 | Ue et al. | |
| 2008/0025203 A1 * | 1/2008 | Tallet | 370/216 |
| 2008/0062986 A1 | 3/2008 | Shand et al. | |
| 2008/0089227 A1 * | 4/2008 | Guichard et al. | 370/228 |
| 2008/0192627 A1 | 8/2008 | Lichtwald | |
| 2008/0219153 A1 | 9/2008 | Shand et al. | |
| 2008/0317055 A1 | 12/2008 | Zetterlund et al. | |
| 2009/0129771 A1 | 5/2009 | Saniee et al. | |

FOREIGN PATENT DOCUMENTS

| | | |
|---|---|---|
| WO | WO 01/78278 A1 | 10/2001 |
| WO | WO 02/06918 | 1/2002 |

OTHER PUBLICATIONS

Wikipedia, "Ping," located in the internet at <http://wikipedia.org/wiki/Ping>, retrieved on Feb. 1, 2007, 3 pages.

International Searching Authority, "Notification of Transmittal of the International Search Report and the Written Opinion of the International Searching Authority, or the Declaration", international application No. pct/us06/28083, Received Nov. 30, 2007, 11 pages.

Claims, international application No. pct/us06/28083, 3 pages.

Karn, "Improving Round Trip Time Estimates in Reliable Transport Protocols", ACM, Transaction on Computer Systems, 1987, 8 pages.

AU Examiner's First Report for foreign patent application No. 2004311004 dated Jun. 23, 2008 (1 pg).

AU Examiner's Second Report for foreign patent application No. 2004311004 dated Aug. 18, 2008 (1 pg).

Current claims for AU foreign patent application No. 2004311004 (6 pgs).

Office Action from CN for foreign application No. 200480033007.8 dated Apr. 11, 2008 (10 pgs) with English translation (11 pgs).

Current claims for CN foreign patent application No. 200480033007.8 (6 pgs).

Backes, "Spanning Tree Bridges—Transparent Bridges for Interconnection of IEEE 802 LANs", 1988, IEEE, 5 pages.

European Patent Office, "Supplementary European Search Report", application No. EP 04795045, May 27, 2009, 4 pages.

Claims, application No. EP 04795045, 4 pages.

Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.

State Intellectual Property Office of the People's Republic of China, "The First Office Action", filing No. 200680001652.0, May 8, 2009, 15 pages.

Claims, filing No. 200680001652.0, 4 pages.

European Patent Office, "Supplementary European Search Report", application No. EP 06720965, dated Jul. 21, 2009, 6 pages.

Claims, application No. EP 06720965, 4 pages.

Karn Phil et al., Improving Round-Trip Time Estimates in Reliable Transport Protocols, 1987, ACM workshop on Frontiers in computer communication technology, pp. 2-7.

Open System Interconnection Routing Protocol, Jun. 1999, Chapter 41, Internetworking Technologies handbook (all pages of chapter 41).

Open Shortest Path First, Jun. 1999, Chapter 42, Internetworking Technologies handbook (all pages of chapter 42).

European Patent Office, "Communication pursuant to Article 94(3) EPC", Application No. 04795045.6-2416, dated Sep. 7, 2009, 5 pages.

Current Claims, Application No. 04795045.6-2416, 5 pages.

European Patent Office, "Supplementary European Search Report", EP 05749440.3, dated Dec. 4, 2009, 3 pages.

Claims, foreign application No. EP 05749440.3, 3 pages.

Moy, J et al., "OSPF Version 2", IETF Standard, Network Working Group, Internet Engineering Task Force, IETF, Apr. 1998, XP015008112, NFC 2328, 245 pages.

European Patent Office, "Supplementary Search Report", application No. EP 04812468, dated May 27, 2010, 4 pages.

Claims, application No. EP 04812468, 4 pages.

European Search Report, application No. EPO 06 80 0142, dated Jun. 15, 2010 (8 pgs).

* cited by examiner

PRIOR ART

METHOD AND APPARATUS FOR CONSTRUCTING A REPAIR PATH FOR MULTICAST DATA

FIELD OF THE INVENTION

The present invention generally relates to multicast data. The invention relates more specifically to a method and apparatus for constructing a repair path for multicast data.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One class of routing protocol is the link state protocol. The link state protocol relies on a routing algorithm resident at each node. Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information in the form of a link state packet (LSP) each node constructs a link state database (LSDB), which is a map of the entire network topology, and from that constructs generally a single optimum route to each available node based on an appropriate algorithm such as, for example, a shortest path first (SPF) algorithm. As a result a "spanning tree" is constructed, rooted at the node and showing an optimum path including intermediate nodes to each available destination node. The results of the SPF are stored in a routing information base (RIB) and based on these results a forwarding information base (FIB) or forwarding table is updated to control forwarding of packets appropriately. When there is a network change an LSP representing the change is flooded through the network by each node adjacent the change, each node receiving the LSP sending it to each adjacent node.

As a result, when a data packet for a destination node arrives at a node the node identifies the optimum route to that destination and forwards the packet via the correct interface to the next node ("NEXT_HOP") along that route. The next node repeats this step and so forth.

Such protocols can support both unicast, i.e. single point (source) to single point (destination) data traffic and multicast traffic. Multicast traffic comprises point to multipoint traffic (P2 MP) and multipoint to multipoint traffic (MP2 MP). For example IP (internet protocol) multicast is well known to the skilled reader and is described in document "Internet Protocol Multicast" which is available at the time of writing on the file "IP multi.htm" in the directory "univercd/cc/td/doc/cisintwk/ito_doc" of the domain cisco.com on the World Wide Web.

Multicast allows data packets to be forwarded to multiple destinations (or "receivers") without unnecessary duplication, reducing the amount of data traffic accordingly. All hosts wishing to become a receiver for a multicast group perform a "join" operation to join the multicast group. A multicast tree such as a shortest path tree is then created providing routes to all receivers in the group. The multicast group in a P2 MP group is denoted (S,G) where S is the address of the source or broadcasting host and G is an IP multicast address taken from a reserved address space. As a result routers receiving a packet from the source S to the multicast address G send the packet down each interface providing a next hop along the route to any receiver on the tree.

In the case of MP2 MP multicasts, a shared group is denoted (*,G) allowing multiple sources to send to multiple receivers. The multicast tree is constructed as a shared tree including a shared root or rendez-vous point (RP) which can be determined in any appropriate manner, for example using a "Steiner tree" as will be familiar to the skilled reader. All of the sources register into and send multicast data for the group to the RP which then sends the data down the shared tree to all receivers. In either case the multicast tree is dynamically modified as hosts join, and pruned as hosts leave. For example, if a path changes, a router will send a prune up the old path immediately cutting off the supply of packets, and simultaneously switch the input interface to the new path, sending a join up that path.

During forwarding of multicast data at a router, when a packet is received at the router with a multicast address as destination address, the router consults the multicast forwarding table and sends the packet to the correct next hop via the corresponding interface. As a result, even if the path from the next hop subsequently branches to multiple receivers, only a single multicast packet needs to be sent to the next hop. If, at the router, more than one next hop is required, that is to say the multicast tree branches at the router, then the packet is copied and sent on each relevant output interface.

In order to avoid looping each router ensures that data is only sent downstream away from the source and towards the receiver as upstream-directed traffic would loop back, which is impermissible in multicast. In order to achieve this the router carries out a reverse path forwarding (RPF) check to ensure that the incoming packet has arrived on the appropriate input interface. If the check fails then the packet is dropped. The router uses the unicast forwarding table to identify the appropriate upstream and downstream interfaces in the tree as part of the RPF and only forwards packets arriving from the upstream direction.

Multicast methods which make use of existing forwarding information in this manner belong to the family of "protocol independent multicast" (PIM) methods as they are independent of the specific routing protocol adopted at each router.

Referring to FIG. 1, which is an illustrative network diagram showing implementation of multicast, a network is shown designated generally 100. The network includes nodes A, B, C, D, E, reference numbers 102, 104, 106, 108, 110 respectively. Node B is joined to nodes A, C, D and E via links 112, 114, 116 and 118 respectively. In addition the network includes a multicast group with source S, reference numeral 120 connected to node A via a path 122 which may include additional intermediate routers. The multicast group further comprises receivers X and Y, reference numerals 124, 126 respectively joined to nodes D and E respectively by paths 128, 130. Accordingly when nodes X and Y join the multicast group G with source S they send join messages "JOIN(S,G)" via respective paths 128, 130 which are passed on by nodes D and E towards node S and then via node B and finally node A along the path 122. As a result each node, acting in the multicast router, updates its forwarding table appropriately.

In addition to IP multicast, schemes such as multi-protocol label switching (MPLS) multicast are well known. MPLS is a protocol that is well known to the skilled reader and which is described in document "Multi Protocol Label Switching Architecture" which is available at the time of writing on the file "rfc3031.txt" in the directory "rfc" of the domain "ietf.org" on the World Wide Web. According to MPLS, a complete path for a source-destination pair is established, and values required for forwarding a packet between adjacent routers in the path together with headers or "labels" are prepended to the packet. The labels are used to direct the packet to the correct interface and next hop. The labels precede the IP or other header allowing smaller outer headers.

The path for the source-destination pair, termed a Label Switched Path (LSP) can be established according to various different approaches. One such approach is Label Distribution Protocol (LDP) in which each router in the path sends its label to the next hop router on the path as determined from its IP routing table. Alternatively Resource Reservation Protocol (RSVP-TE) can be invoked in which case, for example, a network administrator can engineer a path, providing strict source routing. In the case of MPLS multicast, therefore, for example, a multicast tree is constructed for example from a P2 MP or MP2 MP LSP.

In the case of failure of network components such as a node or link multicast traffic can be affected until the network converges on the new topology. A solution to this problem is known from MPLS multicast and is described in "Multicast Fast Reroute" which is available at the time of writing on the file "mpls" in the directory "~mngroup/projects" of the domain cs.virginia.edu on the World Wide Web. According to the solution presented therein backup LSPs are precomputed either manually or using an algorithm minimizing the number of routers disconnected from the routing tree for a link failure.

However effective and rapid solutions are required for both link and node protection in, and also embracing IP multicast schemes. Furthermore, during convergence, the interruption to multicast traffic can be proportional to the number of multicast trees on the network. In particular there is a need to switch between old and new input interfaces in the case where the topology change affects which router acts as the preceding router before a given multicast router. In existing systems, when the prune and join messages are sent to update the forwarding decision, during transition across the network, traffic arriving at the old input interface is lost and so there is a delay in receiving traffic until all traffic is coming in on the new input interface.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for constructing a repair path for multicast data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Constructing a Repair Path for Multicast Data
4.0 Implementation Mechanisms-Hardware Overview
5.0 Extensions and Alternatives
1.0 General Overview The needs identified in the foregoing Background, and other needs and objects that will become apparent for the following description, are achieved in the present invention, which comprises, in one aspect, a method for constructing a repair path for multicast data around a non-available component in a data communications network having as components nodes and links therebetween. The method comprises the step performed at a repairing node, of receiving from a notifying node in a network, a notification identifying the notifying node and components through which the notifying node can be reached. The method further comprises the steps of deriving, from the notification, a network repair address for use in the event of non-availability of a component identified in the notification; and constructing a repair path for multicast data for the repair address.

In other aspects, the invention encompasses a computer apparatus and a computer-readable medium configured to carry out the foregoing steps.

2.0 Structural and Functional Overview

Figure 1:
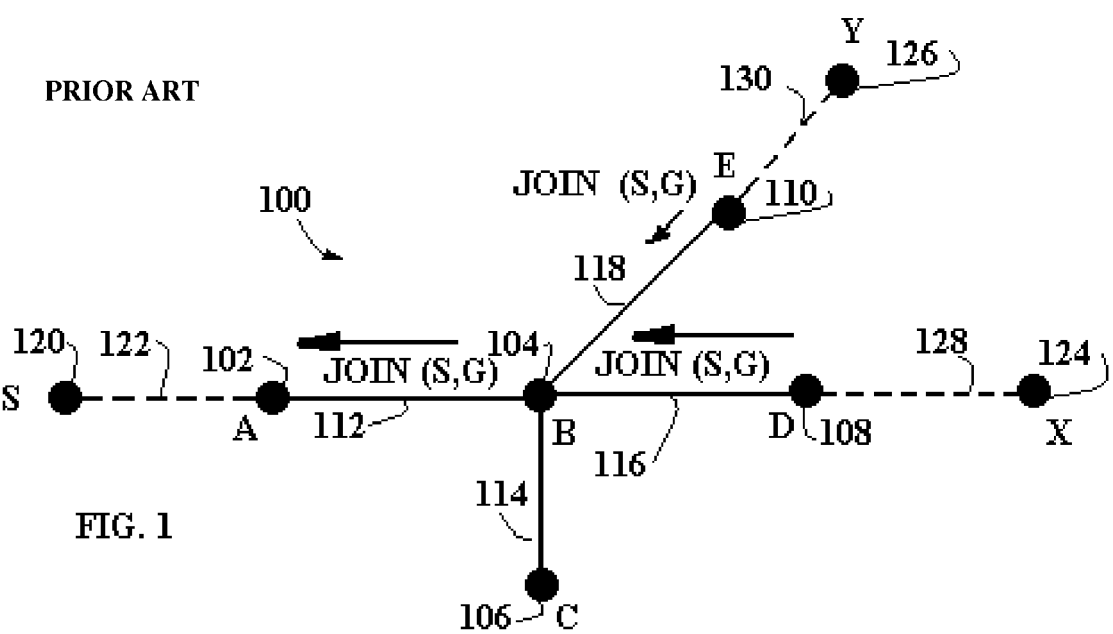
FIG. 1 is a representation of a network illustrating a multicast scheme.
Figure 2:
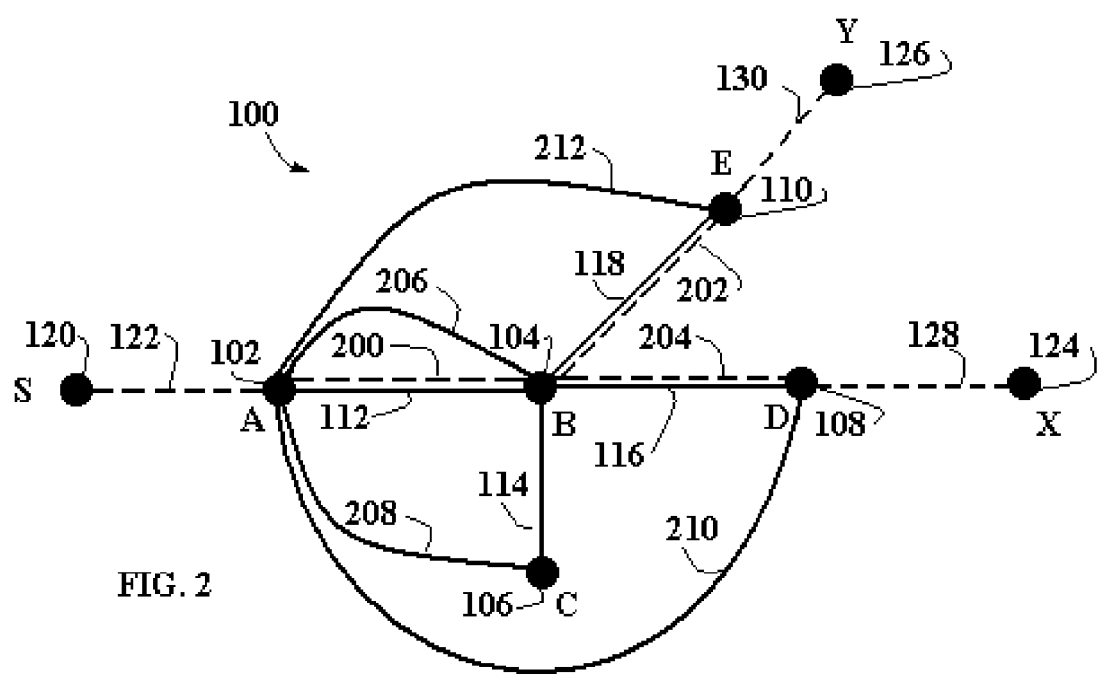
FIG. 2 is a representation of a network illustrating a method of constructing a repair path for multicast data.

In overview a method for constructing a repair path for multicast data can be understood with reference to FIG. 2 which depicts an illustrative network diagram to which the method is applied. The network of FIG. 2 corresponds generally to the network shown with reference to FIG. 1 and like reference numerals denote like components. However it will be appreciated that the network shown is for illustrative purposes only and that the method can be applied to any appropriate network of any size or topology.

Nodes A, B, D and E are all part of a multicast tree denoted by the dotted links 200, 202, 204. A repair strategy is implemented at node A acting as a repairing node for providing a repair path around a non-available component comprising either adjacent link 112 or node B. In the case of failure of link 112 then node A forwards the packet to node B along a repair path 206. In the case of failure of node B, node A forwards packets along repair paths to some or all of its neighbors, nodes C, D and E along respective repair routes 208, 210, 212.

The manner in which the repair paths themselves are selected can be, for example, by assigning a "notvia" address to each component as described in more detail below. Alternatively repair paths can be constructed by deriving from the network topology a first set of nodes reachable from node A without traversing node B, deriving a second set of nodes from which node B (in the case of link repair) or a neighbor of node B (in the case of node repair) is reachable without traversing the link or node B as appropriate, and constructing a repair path to node B or its neighbor via an intermediate node in the intersection in the first and second sets. Then the packet itself may be tunneled to the intermediate node or forwarded using a scheme such as MPLS as appropriate.

In the case of node repair, i.e. repair around non-available node B, then node A may simply repair to each of node B's neighbors, nodes C, D and E or it may repair only to those neighbors within a multicast tree: in the example shown, nodes D and E. Of course in the case of multiple multicast groups, multiple different subsets of the neighbor nodes may be accommodated.

In a further alternative approach a repair multicast group can be formed comprising the neighbor nodes of node B, and an appropriate MP2 MP multicast tree (or multiple P2 MP multicast trees) constructed accordingly. For all approaches, therefore, when a multicast packet is received at node A with next hop node B it will be forwarded according to the appropriate strategy to the target node: node B in the case of link repair or nodes C, D and/or E in the case of node repair, after which they re-enter the multicast tree. Each node can pre-compute the repair strategy for each of its neighbors and/or compute a repair multicast tree excluding itself but including each of its neighbors as appropriate.

Various mechanisms are provided for ensuring that a multicast packet arriving from a repair path is RPF-checked as though it has arrived on the correct incoming interface. Furthermore methods are proposed for managing the RPF switch in routers between old and new interfaces following a topology change.

3.0 Method of Constructing a Repair Path for Multicast Data

In one implementation link or node protection around a failed component using a repair path can be implemented using "notvia" addresses as described in co-pending patent application Ser. No. 10/064,275, filed 22 Feb. 2005 entitled "Method and Apparatus for Constructing a Repair Path around a Non-Available Component in a Data Communications Network" of Michael Shand et al ("Shand et al"), the entire contents of which are incorporated by reference for all purposes as if fully set forth herein. According to Shand et al, in addition to the standard addresses assigned to each node, each interface in the network is assigned an additional repair address, the "notvia address". The semantics of a notvia address are that a packet addressed to a notvia address must be delivered to the router with that address, not via the neighboring router on the interface to which that address is assigned. All participating nodes calculate their paths to the notvia address using the same repair topology as a result of which, when the failure is detected, a repairing node encapsulates the packet to the notvia address of the node interface on the far side of the failure. The nodes on the repair path then know to which node they must deliver the packet, and which network component they must avoid. Accordingly the packet can be forwarded using normal IP forwarding without the requirement for extensions to the forwarding code and only one level of encapsulation is needed.

Figure 3:
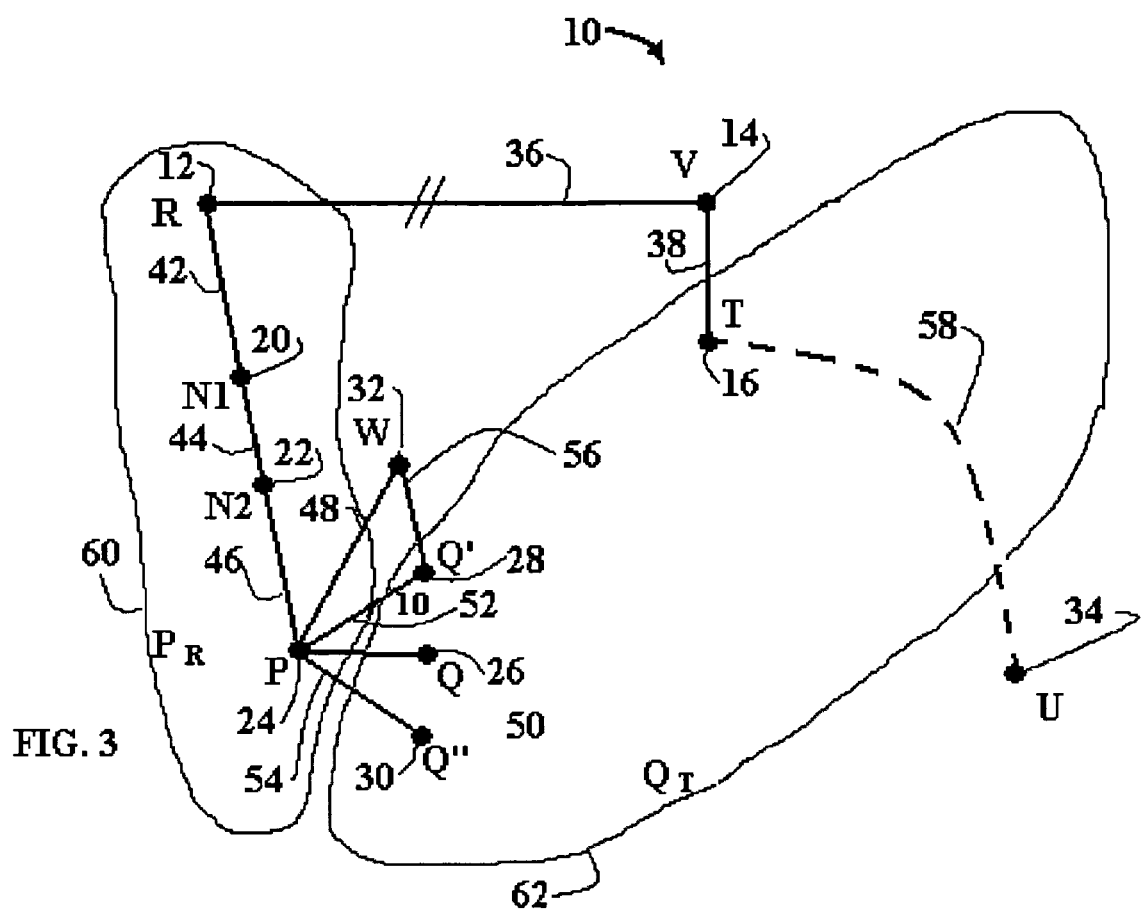
FIG. 3 is a representation of a network illustrating a method of identifying a repair path.

According to an alternative approach, link or node protection around a failed component is achieved by constructing a pre-computed repair path and identifying an intermediate node as discussed above. The manner in which the repair path is identified can be understood with reference to FIG. 3 which depicts an illustrative network diagram to which the method is applied. The network is designated generally 10 and includes nodes R, V, T reference numerals 12, 14, 16, nodes $N_1, N_2$, reference numerals 20, 22, node P, reference numeral 24, nodes Q, Q', Q", reference numerals 26, 28, 30, node U, reference numeral 34 and node W, reference numeral 32. Node V is connected to nodes R and T via respective links 36 and 38. Node R is connected to node P via nodes $N_1$ and $N_2$ joined by successive links 42, 44 and 46. Node P is connected to nodes R, Q, Q' and Q" via respective links 48, 50, 52 and 54 and node R is joined to node Q' via link 56. All of the links have a cost 1 excepting link 52 joining nodes P and Q' which has a cost of 10.

In the case of normal routing node R will forward packets to node W via node S, node T and a path designated generally 58. However referring to FIG. 1 link 36 between nodes R and V has failed. As a result node R must construct a repair path to node T from which the packet can be forwarded, without packets traversing link 36 (and in the case of failure of node V, that node as well).

According to the method described herein the repair path is constructed according to the approach described in co-pending patent application Ser. No. 10/340,371, filed 9 Jan. 2003, entitled "Method and Apparatus for Constructing a Backup Route in a Data Communications Network" of Kevin Miles et al., ("Miles et al."), the entire contents of which are incorporated by reference for all purposes as if fully set forth herein and discussed in more detail below. According to the solution put forward in Miles et al, a repairing node (node R) pre-computes a first set of nodes comprising the set of all nodes reachable according to its protocol other than nodes reachable by traversing an adjacent component V. This is termed here node R's "P-space" $P_R$ reference numeral 60 and the operation is carried out for each adjacent component. The repairing node also pre-computes a second set of nodes comprising the set of all nodes from which a target node (node C) is reachable without traversing the failed component V. This is termed here node T's "Q-space", $Q_T$, reference numeral 62. The method then determines whether any intermediate nodes exist in the intersection between the first and second sets of nodes $P_R$, $Q_T$ or a one-hop extension thereof. When the repairing node detects failure of an adjacent component it tunnels packets for the target node T to a tunnel end point comprising a node in the intersection of the first and second sets of nodes calculated for that failed component.

In particular FIG. 1 shows a network in which $P_R$ and $Q_T$ are one-hop apart in which case "directed forwarding" is implemented between P-space and Q-space, that is, the packet is source routed from node P, the tunnel end-point, to a node in Q-space termed here the "release point". It is possible that multiple nodes in Q-space are within one hop of node U in P-space as represented by node Q, Q' and Q" in the embodiment shown. It will be noted that in the case that node P forwards packets to node Q' then directed forwarding ensures that the packet is sent over link 52 (the higher cost route) rather than via node R and links 48 and 56 (the lower cost route). In the following discussion nodes Q, Q', Q" will be referenced generally as node Q As the scheme provides protection both for link and node failure some mechanism is required to accommodate both possibilities. In a first approach, node failure is assumed in all cases unless the node is a single point of failure, i.e. provides the only path to one or more network destinations, in which case link repair is attempted. A further mechanism is described in co-pending patent application Ser. No. 10/346, 051, filed 15 Jan. 2003, entitled "Method and Apparatus for Determining a Data Communication Network Repair Strategy" of Stewart Bryant et al ("Bryant et al"), the entire contents of which are incorporated by reference for all purposes as if fully set forth herein. In particular, according to the approach described in Bryant et al a repairing node detects a failure along an interface which may arise from failure of the adjacent link or the adjacent node.

For example referring to FIG. 2, node A may detect a failure which is either of link 112 or node B. Node A first implements a link repair strategy along repair path 206 to node B but first sends a loop detection probe along the path, setting a timer at the same time. If node B sends an acknowledgement of the probe then this means that the link repair strategy is appropriate. If the probe is returned from another node, this implies that node B has failed and that the packet has been looped back to node A. If neither of these events occur within time T then node failure is assumed. If node failure is detected then the appropriate node repair strategy is implemented instead.

In either case, single or multiple tunnels can be used to implement the repair paths or forwarding paradigms such as MPLS can be adopted as described in co-pending patent application Ser. No. 10/976,076 filed 27 Oct. 2004, entitled "Method and Apparatus for Forwarding Data in a Data Communications Network" of George Swallow et al (Swallow et al"), the entire contents of which are incorporated by reference for all purposes as if fully set forth herein. With reference once again to FIG. 3, in the MPLS implementation, in the case where the intermediate node lies both in P-space and Q-space and directed forwarding is not required then node R simply computes the repair path to node P and constructs a label switched path to node P. Where, however, directed forwarding is required the packet from node R to node P carries a directed forwarding instruction for node P and manners in which this can be achieved is described in more detail below. In addition, node R also discovers the node in Q-space's label for forwarding the packet to the destination. As a result node R sends packets into a tunnel with a top label P and next in the label stack the label that P reaches to use Q after which the packet is emitted into the IP network from node Q.

Figure 4:
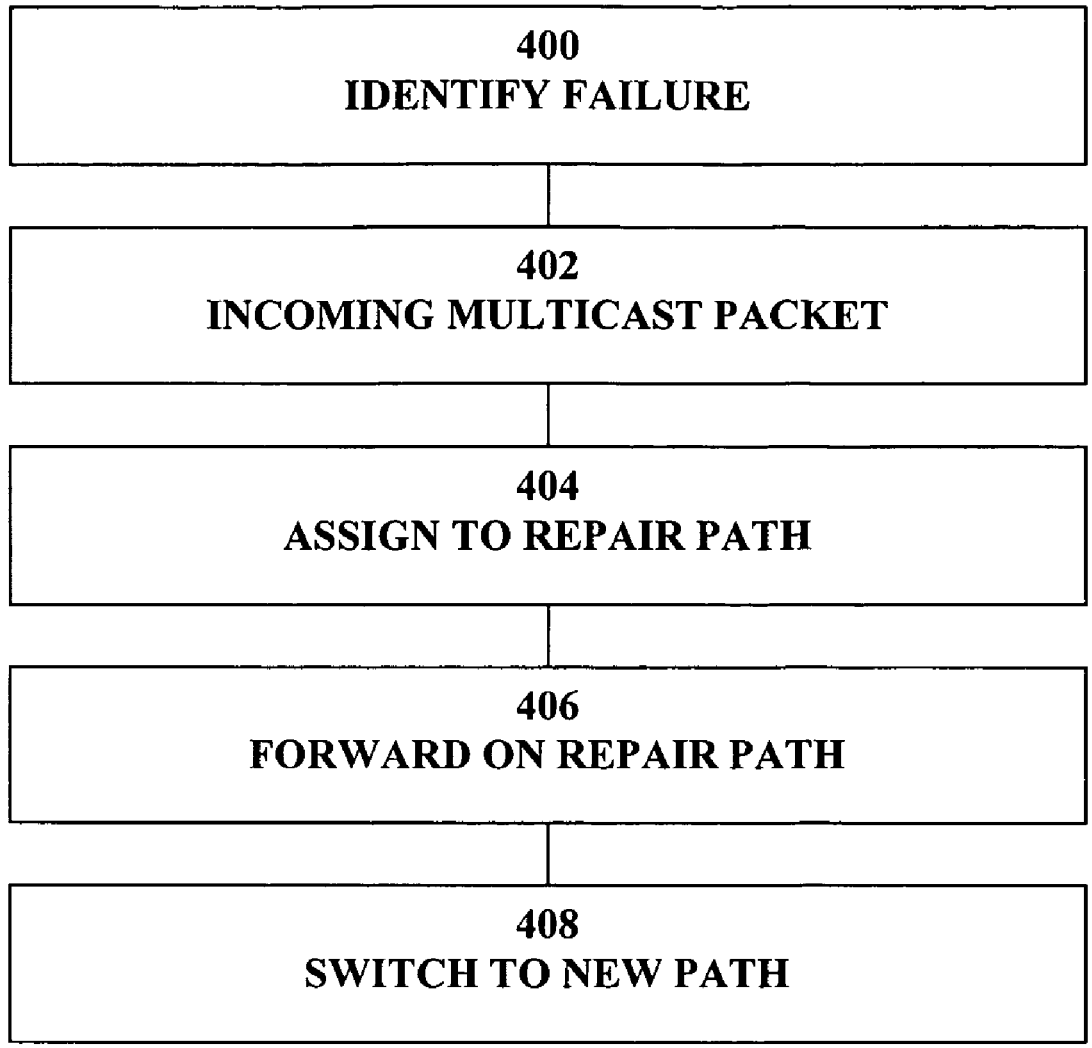
FIG. 4 is a flow diagram illustrating implementation of construction of a repair path for multicast data.

The manner in which the repair paths are implemented, using the approaches described above, for multicast traffic is described below with reference to FIGS. 4 to 6 which are flow diagrams illustrating the steps carried out at a repairing node in each case. It will be noted that these steps can be carried out at each node on a network in case it must act as a repairing node and in relation to repairs for each adjacent component including both link and node in order to pre-compute all possible repair paths. Alternatively it may be computed only at each node which itself is part of a multicast tree and/or for each neighboring component which is part of a multicast tree. In this case, however, a repairing node joining a multicast group or becoming part of a multicast tree must precompute repair routes at this point. In any event repair paths can be obtained from pre-computed unicast repair paths.

Referring once again to the network shown in FIGS. 1 and 2 in relation to the failure of link 112 or node B and the appropriate protection strategy by node A, then a link repair strategy may first be implemented as discussed above with reference to Bryant et al for example in the event that node B is a single point of failure, say, to node E.

In block 400 the failure is identified and in block 402 an incoming multicast packet is received with node B as next hop. In block 404 the repairing node assigns the packet to the appropriate repair path—in this instance the link repair path 206 pre-computed as described above. In block 406 node A forwards the packet along the repair path. In the case that the notvia address is used, this approach has the advantage in multicast repair that incoming packets can be easily associated with the expected incoming interface for the purposes of the RPF check since the notvia address indicates the incoming interface.

Where, alternatively, the packet is tunneled then node B acts as a repair enabling node and needs to know that anything received on the multicast repair tunnel should be treated as if it had arrived from the broken link as a result of which the RPF check will allow the packet to be forwarded further downstream in a multicast tree. This can be carried out, for example, by appropriate configuration at node B to recognize that packets coming in from a repair link should be treated accordingly. This may be either automatically implemented for all packets arriving on the repair path or may be triggered upon recognition at node B of failure of the link 112. An additional tunnel is required to the target node B, to ensure the packet arrives there, and the RPF check can be managed in this manner alternatively.

An alternative recognition method may be adopted in the case of MPLS implemented repair along the pre-computed repair path. In that case the label stack includes, in addition to a A's label for P and P's label for Q, the label that Q uses to reach B and a further label signaled by B to A. This label is then recognized at B such that the incoming packet is received and processed as though it had come in by the correct interface, that is the broken link, such that it is propagated as a multicast into the downstream multicast tree. The label can be signaled in any appropriate manner, for example via the PIM hello option.

In an alternative configuration a backup path can be built using RSVP-TE or any other protocol using explicit paths.

In block 408, once the network has converged on the new topology the repairing node tears down the repair path for example after a period greater than or equal to the maximum expected convergence period and switches to the normal forwarding path in the new topology as discussed in more detail below.

According to another approach, however, it is possible for the switch to be triggered by a signal received from node B indicating that it has converged on the new topology. For example the message can comprise a PIM prune message from B to A with sufficient information for A to know that this is to prune the backup tunnel towards node B or, as appropriate, the label signaled by node B to node A for repair.

In the case of link failure, repair paths need only be computed for protection of links to nodes within the multicast tree.

If the link repair fails as described above with reference to Bryant et al or a requirement for node repair is otherwise known then a first approach to node protection is described with reference to FIG. 5 which shows the relevant steps performed at a repairing node such as node A around a failed node such as node B.

In block 500 the failure is identified and in block 502 the incoming multicast packet with the failed node as next hop is received. In block 504 the packet is unicast along the repair path for each of the neighbors of node B, that is path 208, 210, 212 to each of nodes C, D and E respectively, where the repair paths are pre-computed as described above. Once again the packets can be sent to the notvia addresses, tunneled or, where multiple tunnels are not desirable, an MPLS label stack can be added in the same manner as for link repair, as described above. In this case each of the neighbors of node B, nodes C, D and E, must signal the relevant label to node A when acting as repair enabling nodes.

In block 508 the repairing node switches to the new path once convergence has taken place in the same manner as described above with reference to link repair.

Figure 5:
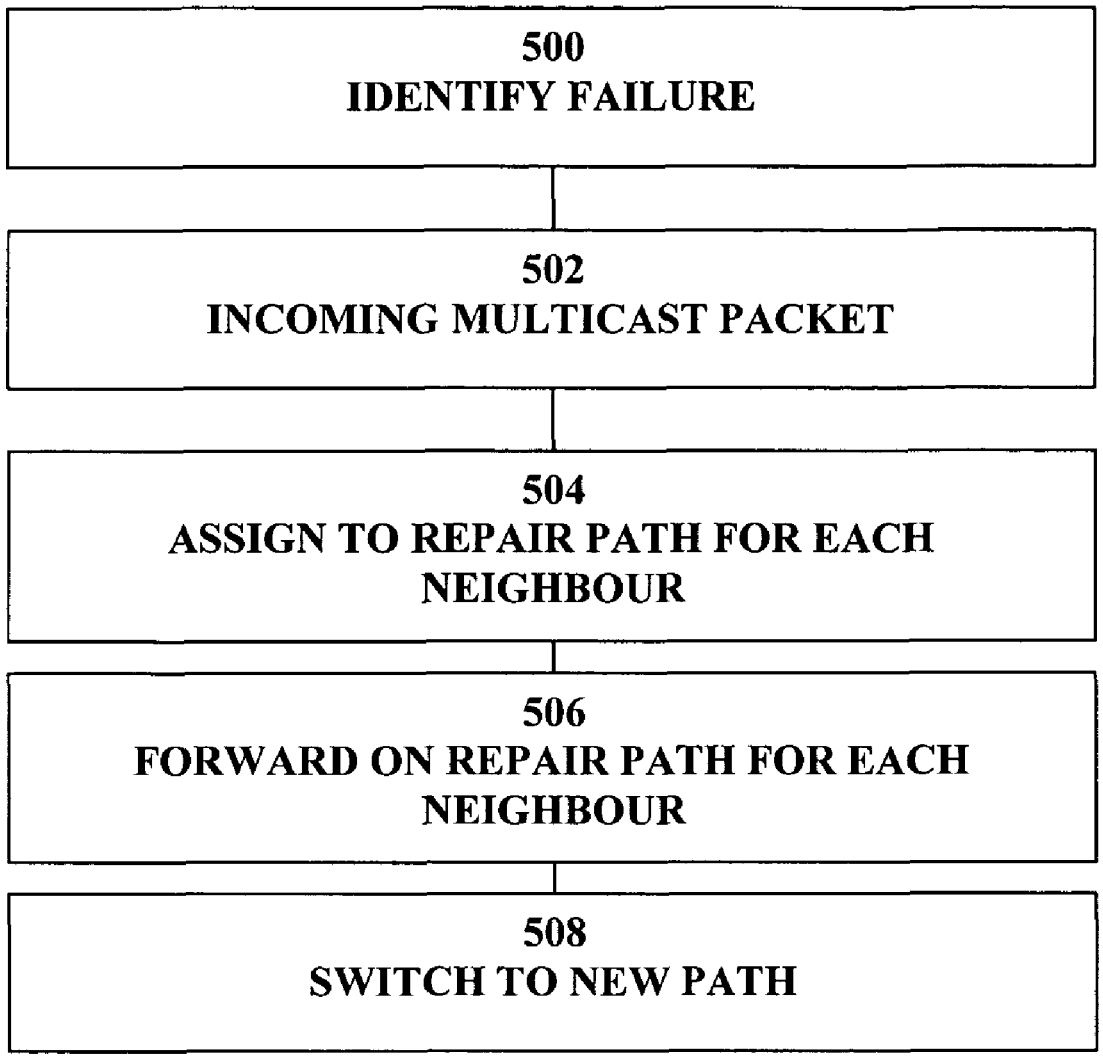
FIG. 5 is a flow diagram illustrating an alternative implementation of construction of a repair path for multicast data.
Figure 6:
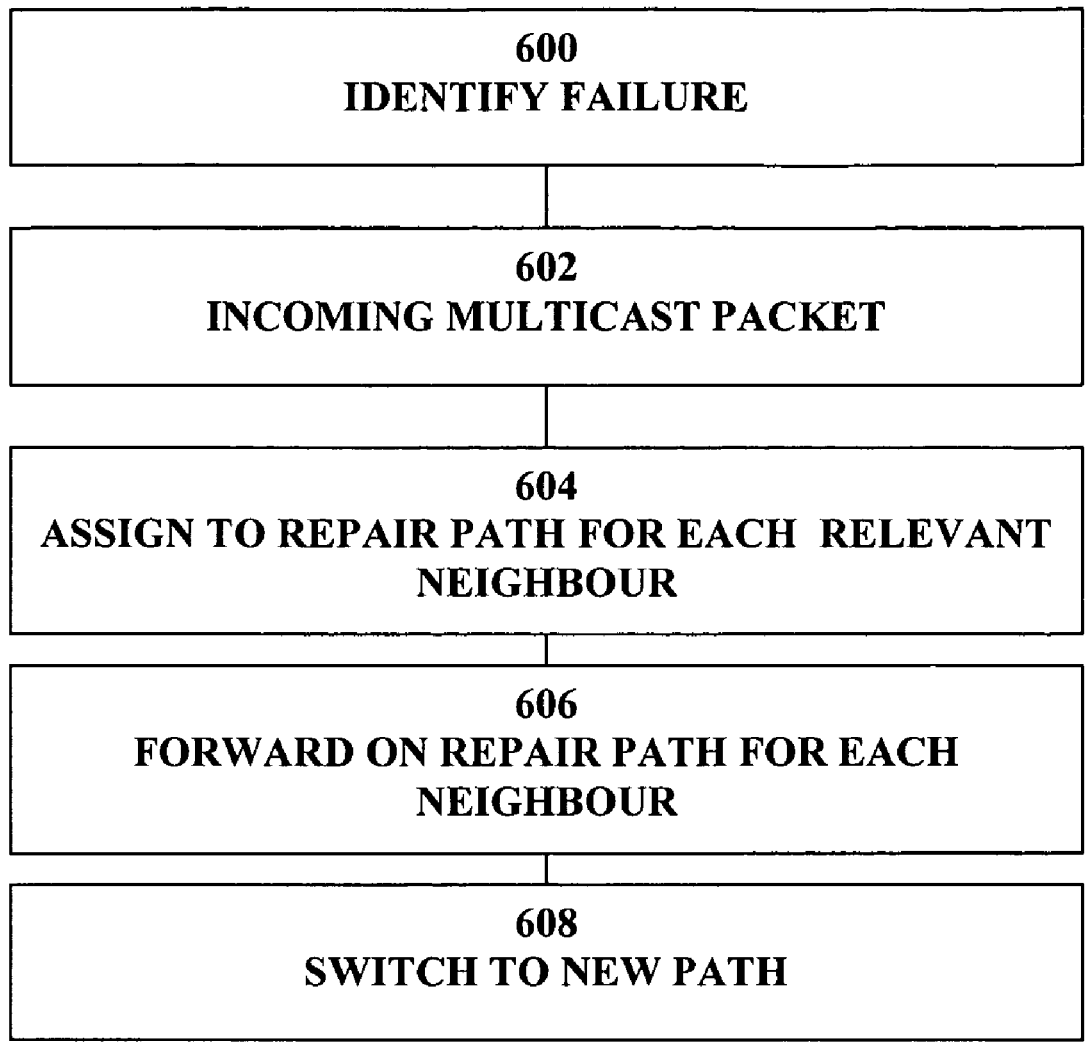
FIG. 6 is a flow diagram illustrating a further alternative implementation of construction of a repair path for multicast data.

The node repair failure approach of FIG. 5 provides a thorough repair strategy but gives rise to unnecessary replication especially in the event that some of the neighbor nodes to the failed node are not part of the multicast tree as the multicast packets will simply be dropped by these nodes once decapsulated.

Accordingly an alternative node repair strategy performed at a repairing node is described with reference to FIG. 6. In block 600 the failure is identified and in block 602 an incoming multicast packet is received at the repairing node. In block 604 the packet is assigned to the repair path for each relevant neighbor of failed node B. In particular only those neighbors which are in the multicast tree for the relevant multicast group needs to have traffic repaired to them. For example in the case of FIG. 2, traffic only needs to be repaired to nodes D and E via repair paths 210, 212. Of course where there are multiple multicast groups, different subsets of the neighbor nodes may be repaired to for different multicasts as appropriate.

Node A, the repairing node, must know the members of the or each multicast group in order to forward the packets along the relevant repair paths. This can be achieved by signaling at each relevant neighbor, for example, or by learning from each (S, G) JOIN message the set of routers that require the traffic.

This approach can be implemented with reference to FIG. 1 by adding to the join signal, in addition to the (S, G) identification, identification of the outgoing interfaces on the notifying node. For example in the case of the network shown in FIG. 1, node B sends a notifying node a join (S, G) with the interfaces to nodes E and D appended, representing the interfaces along which it received join messages. As a result node A knows that for that multicast group (S, G) it must repair to nodes D and E.

In addition, each of the repair enabling nodes D and E must be able to recognize repaired packets as though they have come in on the correct incoming interface for example by implementing the approach described with reference to the link repair strategy described above. Alternatively, once again, "notvia" addresses can be used as discussed above.

In block 606, therefore, the multicast packets are forwarded on the relevant repair paths and on block 608 the repairing node switches to the new topology after conversion in the manner described above.

Figure 7:
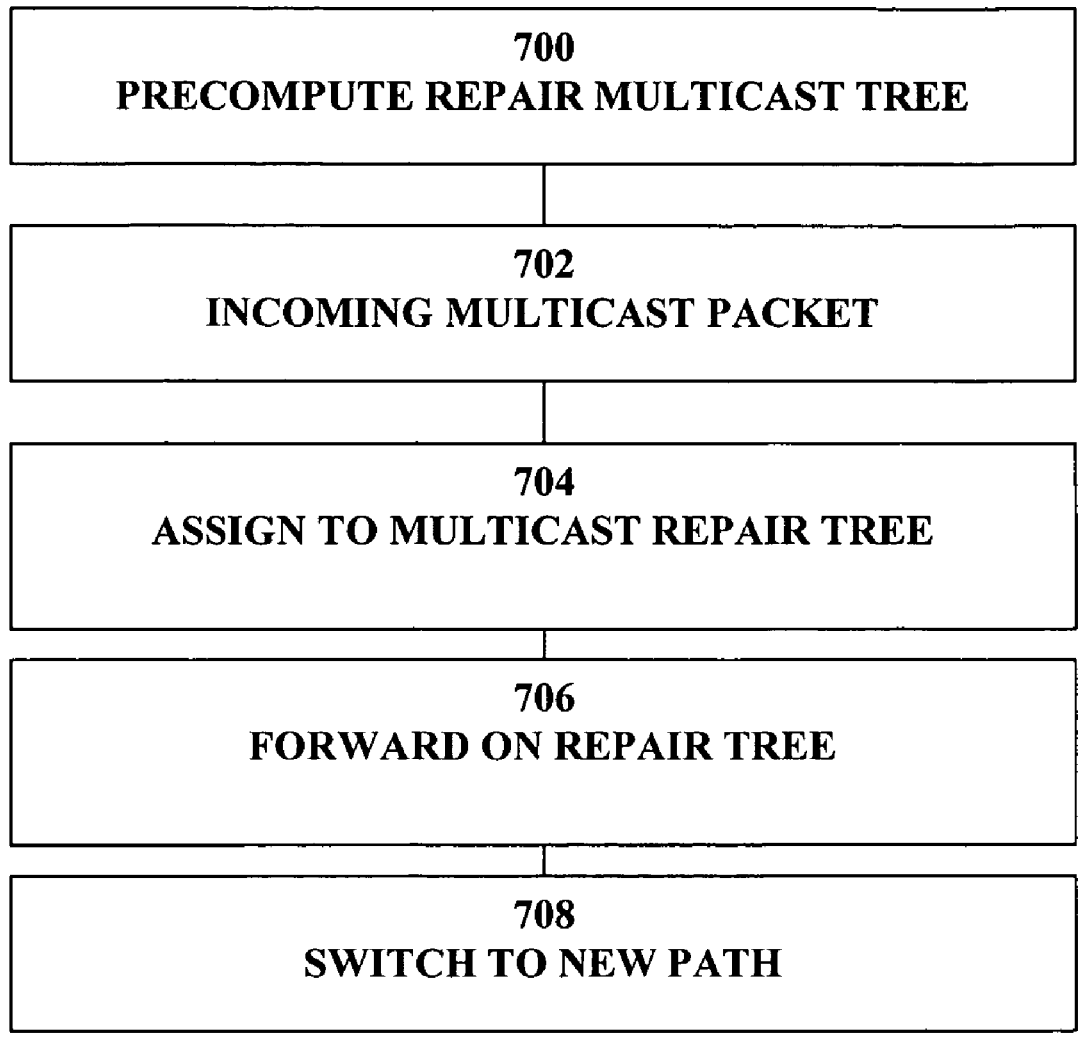
FIG. 7 is a flow diagram illustrating another further alternative implementation of construction of a repair path for multicast data.

In an alternative approach to using repair paths derived by examining the intersection between P and Q space or by using notvia addresses, a repair multicast tree may instead by implemented as shown in FIG. 7, which is a block diagram illustrating the steps involved in implementing the method. The steps are performed, for example at each node in the network which needs to create a multicast repair tree around itself should it become non-available, and/or at each repairing node for each of its adjacent nodes as appropriate.

Figure 8:
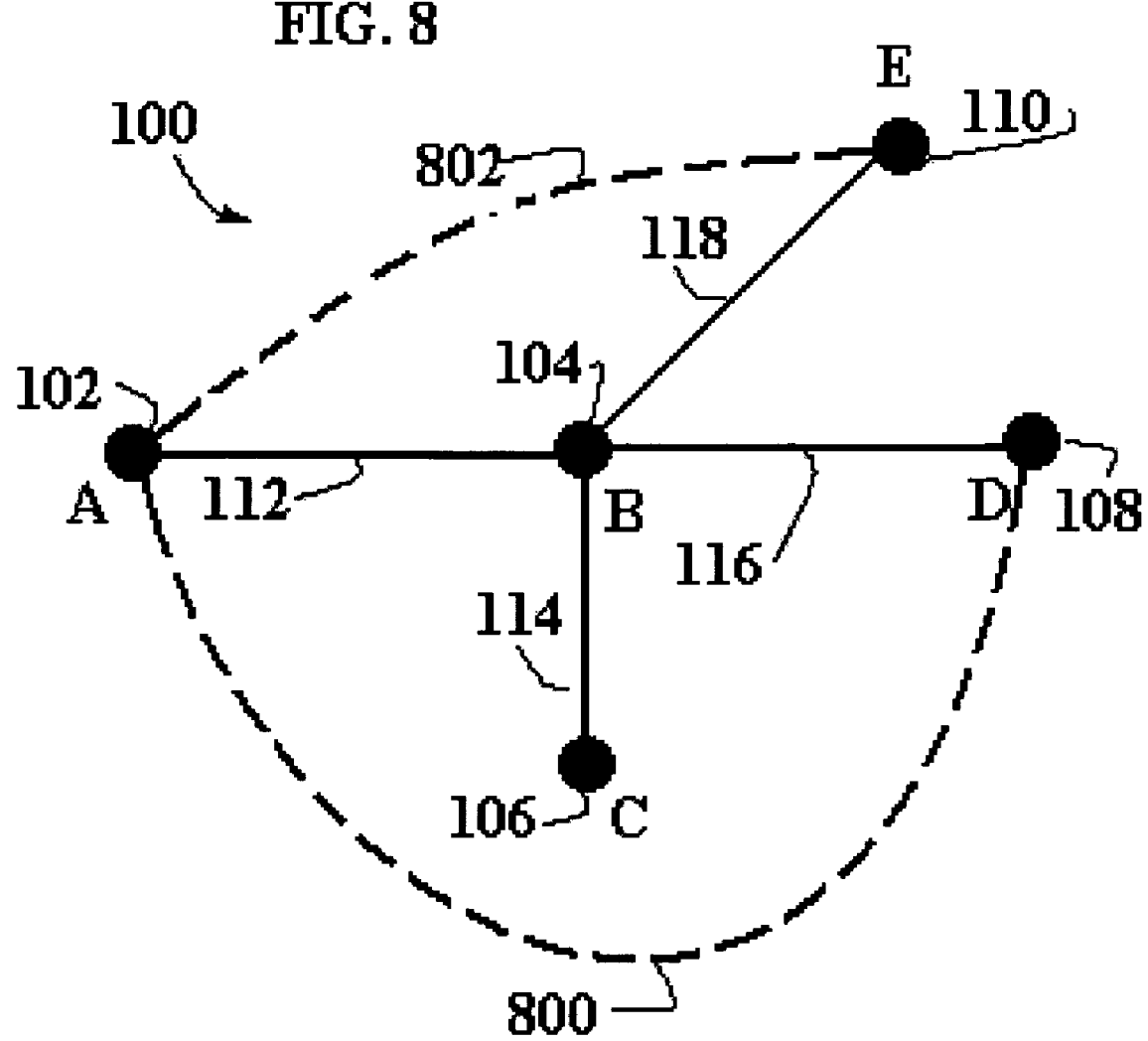
FIG. 8 is a representation of a network illustrating the method of FIG. 7.

In block 700 a repair multicast tree is pre-computed. FIG. 8 is an illustrative network diagram showing an MP2MP multicast repair tree. In particular, treating B as a potential non-available component, the tree comprises nodes A, D and E and paths 800, 802 (which may, of course, involve additional nodes and links as appropriate) between them. The multicast repair tree can be built in any appropriate manner for example using a Steiner tree approach. The tree is bidirectional so that a packet can be introduced in at any point and it will be delivered to all the other members. The backup tree for example can be built with receiver join based label switched tree building protocol providing the capability to signal the labels hop by hop along the tree and set up the correct forwarding state and node B can invoke construction of the tree sending out a join onto each of its links with a special flag indicating that it is its own repair tree. The tree can be built exactly hop-by-hop in the manner desired by node B. The special flag is recognized by the other nodes A, D, E and removed such that the joins are normal joins. In that case, nodes A, D and E then maintain this tree and consider themselves as an end point of it. The tree is dynamically updated with topology changes.

It will be seen that each node can invoke a repair tree around itself, therefore. Furthermore the tree can include all of its neighbors or a sub-set of neighbors which are in a multicast tree themselves. Where there are multiple multicast trees it is possible alternatively simply to include all neighbors in a single repair tree which will then accommodate repair of multicast data for any tree for which node B fails. However this will lead to dropping of packets at non-multicast nodes.

It will further be seen that instead of an MP2 MP tree, multiple P2 MP trees can be constructed at each of nodes A, D, E as source node if desired.

In block 702, an incoming multicast packet is received at a repairing node, for example node A. Then, in block 704, the incoming packet is assigned to the multicast repair tree and forwarded on the multicast repair tree in block 706. Then, in block 708, the repairing node switches to the new topology at an appropriate instant in the same manner as described above with reference to link protection.

As a result a single-label MPLS MP2 MP tree can be constructed between all or appropriate neighbors of the non-available node. Then any neighbor that would have wanted to send traffic to the non-available node will send the traffic into the MP2 MP tree and other neighbors will RPF these packets as if they had come from B, and drop or forward them, as appropriate according to normal RPF operation. As a result the approach is signal free and relies on forwarding path intelligence rather than signaling path intelligence.

Figure 9:
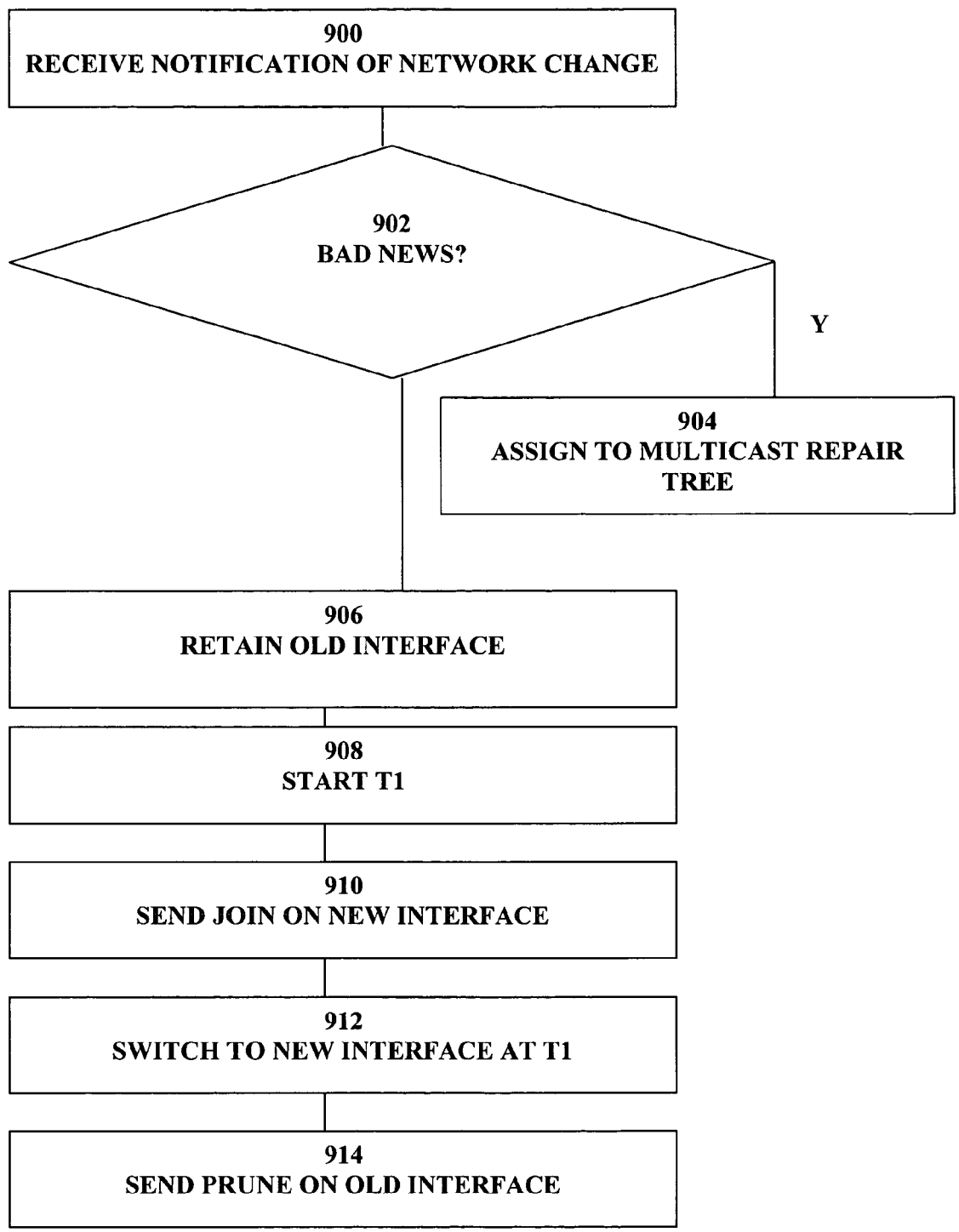
FIG. 9 is a flow diagram illustrating management of RPF checks at a multicast router.

According to a further aspect a method of managing the switch of RPF check following a topology change is discussed with reference to FIG. 9 which is a flow diagram illustrating the steps involved. In particular the method discussed ensures that there is no packet loss arising because of the transition between interfaces, in the case of "good news". "Good news" comprises a topology change that means that traffic will switch to a new input interface on the router but could still come in on the old interface, that is to say, the old path is not completely broken. This can happen, for example, where a cost decrease across a link means that the shortest path changes to include that link, affecting the input interface or it can mean that there is a cost increase on the old path again changing the shortest path, but not such that the old path is closed down entirely. One example of good news is where there is a failure on the old path but a repair route is instituted. In the case of "good news" traffic could continue to arrive on the old interface for some time, for example during the network transition. Conversely "bad news" comprises a network change that breaks the old path entirely for example an unrepaired link or node failure on the old path leading to a change in the input interface on the router. The present method recognizes that in the case of good news some traffic can be maintained by staging the RPF switch and further recognizes that the nature of the topology change, that is good news or bad news can be obtained from the IGP (Interior Gateway Protocol). For example in the case of a repaired failure repair capability will have previously been advertised in LSPs according to the IGP. The method can be implemented at any router in the multicast tree including a repairing router. As discussed above, removal of the repair path can be after a time-out period greater than or equal to a known maximum IGP convergence delay. In an optimization removal can be triggered by a prune sent by the downstream neighbor which travels in the reverse unicast repair path from the neighbor to the repairing router.

In particular in block 900 a multicast router, that is, a router in the multicast tree enabled to recognize and forward multicast packets appropriately, receives notification of a network change which can be, for example, a component failure, a link cost change or introduction of a new component comprising a node or link. Notification can be received, for example via interior gateway protocol (IGP) in the form of a link-state packet. In block 902 the router establishes whether the notification represents "good news" or "bad news". For example if notification comprises a component failure resulting in change of the input interface and closure of the previous path then this is treated as "bad news" and in block 904 an immediate transition to the correct new input interface implemented in order that the RPF check immediately begins to accept traffic only coming in on the correct new input interface.

In the case that the notification relates to a network change such as a link cost change or link addition or a repaired link failure which changes the input interface but does not fail the old path completely then this is treated as "good news" and, in block 906, traffic arising on the existing, old interface is allowed to continue. Simultaneously, in block 908 a timer Ti is started in block 908 and in block 910 a join message is sent on the new interface to enable construction of the new multicast tree taking account of the network topology change.

In block 912, upon time out of the timer Ti, the router switches to the new interface and flips the RPF accordingly such that data coming in on the old interface is now dropped and sends a prune on the old interface in block 914. Accordingly the timer period must be set for an appropriate period allowing convergence of the network on the changed topology which ensures that data "in transit" during convergence and arriving on the old interface is forwarded correctly. Furthermore, the period must be set such that the new interface is not configured while an upstream router is not sending to the new interface which would result in packet loss.

Accordingly, the RPF switch is ordered such that downstream nodes in the tree always update after upstream nodes. This can be implemented in any appropriate manner, for example by invoking an ordered update regime of the type described in co-pending patent application Ser. No. 10/685, 622, filed 14 Oct. 2003 entitled "Method and Apparatus for Generating Routing Information in a Data Communications Network" of Stefano Previdi et al ("Previdi et al") the entire contents of which are incorporated by reference for all purposes as if fully set forth herein. According to the approach set out in Previdi et al a router identifies an "affected set" of nodes affected by the network change for example by running a reverse SPF routed at the next hop node to the affected component. The furthest node upstream of the router and which is affected by the change is identified and a delay period then calculated it based on the number of hops there between. As a result a longer delay will be instigated at nodes further downstream such that the RPF switch will propagate downstream through the multicast tree in order, avoiding packet loss. It is found that the ordered invocation is effective whatever the nature of the "good news" detected.

As a result a simple time-based system is provided without requiring external events to trigger specific steps. However in an alternative approach the system can be data driven, for example when traffic is detected on the new input interface the switch can be made which also allows effective ordering of the transition but at the cost of packet inspection.

It will further be noted that if repair paths have been implemented in the manner described above with reference to FIGS. 2 to 8 then appropriate prunes need to be sent out to tear down the repair path if it is not being implemented at the repairing node itself.

The manner in which the method described herein is implemented may be in software, firmware, hardware or any combination thereof and with any appropriate code changes as will be apparent to the skilled reader without the need for detailed description here. The approach can be adopted in relation to any service provider providing a reliable multicast including, but not limited to broadcast video via IP multicast.

4.0 Implementation Mechanisms—Hardware Overview

Figure 10:
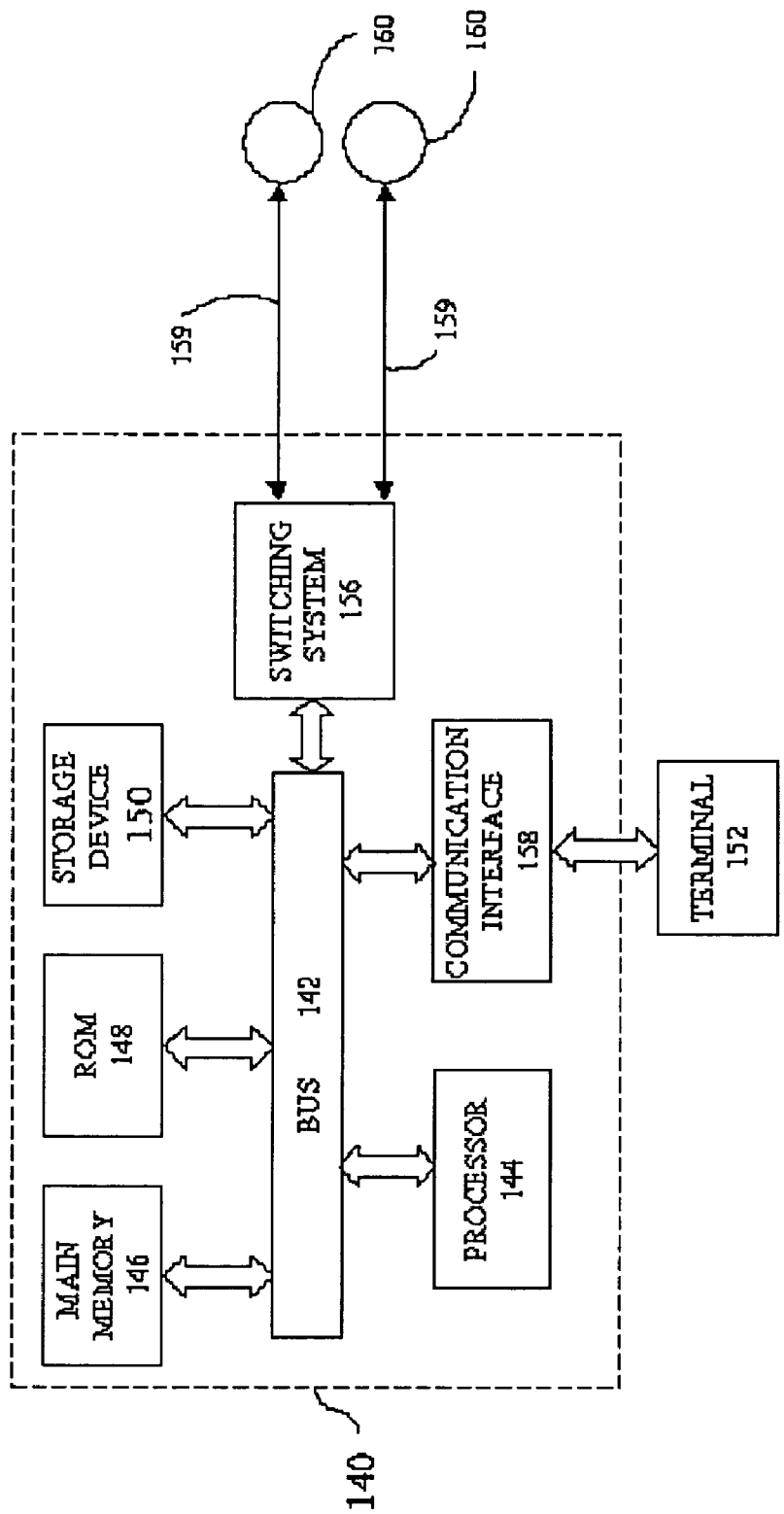
FIG. 10 is a block diagram that illustrates a computer system upon which a method for constructing a repair path for multicast data may be implemented.

FIG. 10 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a repairing or repair enabling node, the above described method of constructing or enabling a repair path. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, and volatile media. Non-volatile media includes, for example, optical or magnetic disks, such as storage device 150. Volatile media includes dynamic memory, such as main memory 146.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism and forwarding paradigm can be adopted to implement the invention. The method steps set out can be carried out in any appropriate order and aspects from the examples and embodiments described juxtaposed or interchanged as appropriate. For example the method can be implemented using link state protocols such as intermediate system-intermediate system (IS-IS) or open shortest path first (OSPF), or routing vector protocols and any forwarding paradigm, for example MPLS. The method can be applied in any network of any topology and in relation to any component change in the network for example a link or node failure, or the introduction or removal of a network component by an administrator.

The method can be applied in relation to any multicast scheme including PIM-DS and BIDIR and indeed different multicast/forwarding schemes can be used for normal multicast and the repair schemes. The approach can be implemented in relation to any number of multicast groups.

What is claimed is:

1. A method, in a data communications network having as components nodes and links therebetween, of constructing a repair path for multicast data around a non-available component comprising:

at each repairing node in the data communications network:
   for each notifying node in the data communications network that is not the repairing node:
      while the notifying node is still available:
         receiving, from the notifying node in the data communication network, a notification identifying the notifying node and a set of all components that are adjacent to the notifying node and through which the notifying node is reachable;
      for each component from the set of all components that are adjacent to the notifying node and through which the notifying node is reachable:
         deriving, from the notification, a network repair address for use in the event of non-availability of the component identified in the notification; and using the repair address from the notification, constructing a repair path for the component identified in the notification for multicast data for use in the event of non-availability of the component identified in the notification.

2. A method as claimed in claim 1 in which the repair path is pre-computed for each network repair address.

3. A method as claimed in claim 1 in which the repair path is pre-computed for each network repair address to which multicast data is sent by the repairing node when available.

4. A method as claimed in claim 1 in which the network repair address is for use in the event of non-availability of a component comprising an adjacent node or link to the repairing node.

5. A method as claimed in claim 1 further comprising the steps, performed at the repairing node, of:
receiving a multicast data packet for which the non-available component is a next-hop; and
forwarding the packet along a repair path.

6. A method, in a data communications network having as components nodes and links therebetween defining a network topology, of constructing a repair path for multicast data around a non-available component comprising:
at each repairing node in the data communications network:
for each notifying node in the data communications network that is not the repairing node:
while the notifying node is still available, receiving, at a repairable node, from the notifying node in the data communication network, a notification identifying the notifying node and a set of all components that are adjacent to the notifying node and through which the notifying node is reachable;
for each component from the set of all components that are adjacent to the notifying node and through which the notifying node is reachable:
deriving, from the topology, a first set of nodes reachable from the repairing node without traversing the component;
for a target node adjacent the component, deriving from the topology a second set of nodes from which the target node is reachable without traversing the component; and
constructing a repair path for multicast data to the target node comprising intermediate nodes that belong to the intersection of the first set and the second set.

7. A method as claimed in claim 6 in which the multicast data is forwarded along the repair path using one or a combination of tunneling, multiple tunneling and directed forwarding.

8. A method as claimed in claim 7 in which repair paths are constructed to all neighbors of each of the component.

9. A method as claimed in claim 7 in which repair paths are constructed for all target nodes in a common multicast tree with the repairing node.

10. A method as claimed in claim 9 in which target nodes send a notification to the repairing node of which groups they belong to.

11. A method as claimed in claim 10 in which the notification comprises a multicast group join message.

12. A method as claimed in claim 7 in which the target node is configured to recognize multicast data arriving from a repair path as valid multipath data.

13. A method as claimed in claim 6 in which multicast data is forwarded along the repair path as a Multiprotocol Level Switching (MPLS) packet.

14. A method as claimed in claim 13 in which the MPLS packet includes a label signaled by the target node identifying the packet as a valid multicast packet.

15. A method as claimed in claim 13 in which the target node recognizes a packet including said label as a valid multicast packet.

16. A method, in a data communications network having as components nodes and links therebetween, of constructing a repair path for multicast data around a non-available component, comprising:
at each repairing node in the data communications network:
for each notifying node in the data communications network that is not the repairing node:
while the notifying node is still available, receiving, from the notifying node in the data communication network, a notification identifying the notifying node, a set of all components that are adjacent to the notifying node and through which the notifying node is reachable and repair addresses for each component through which the notifying node is reachable;
determining that one of the components in the set of all components that are adjacent to the notifying node and through which the notifying node is reachable became a non-available component;
identifying neighbors of the non-available component in a common multicast group as a repair multicast group; and
using a repair address from the notification for the non-available component, constructing a repair multicast tree therefor.

17. A method as claimed in claim 16 in which the repair multicast tree is pre-computed at a node treating itself as a non-available component and signaled to the repair multicast group.

18. A method, in a data communications network having as components nodes and links therebetween, of enabling repair along a repair path around a non-available component for multicast data, comprising:
at each repairing node in a data communications network:
for each notifying node in the data communications network that is not the enabling node:
while the notifying node is still available, receiving, from the notifying node in the data communication network, a notification identifying the notifying node, a set of all components that are adjacent to the notifying node and through which the notifying node is reachable and repair addresses for each component through which the notifying node is reachable;
determining that one of the components from the set of all components that are adjacent to the notifying node and through which the notifying node is reachable became a non-available component;
identifying data on an input interface corresponding to a repair path for the non-available component in the notification as multicast repair data sent to the nodes within a multicast tree rooted at the non-available component; and
treating the identified data as though received on the input interface corresponding to the non-available component.

19. A method as claimed in claim 18 in which the multicast repair data is identified by means of recognition of a label carried with the multicast data.

20. A computer readable non-transitory storage medium comprising one or more sequences of instructions for constructing a repair path for multicast data which, when executed by one or more processors, cause the one or more processors to perform:
 at each repairing node in a data communications network:
  for each notifying node in the data communications network that is not the repairing node:
   while the notifying node is still available:
    receiving, from the notifying node in the data communication network, a notification identifying the notifying node and a set of all components that are adjacent to the notifying node and through which the notifying node is reachable;
    for each component from the set of all components that are adjacent to the notifying node and through which the notifying node is reachable:
     deriving, from the notification, a network repair address for use in the event of non-availability of the component identified in the notification; and
     using the repair address from the notification, constructing a repair path for the component identified in the notification for multicast data for use in the event of non-availability of the component identified in the notification.

21. A computer readable non-transitory storage medium as claimed in claim 20 in which the repair path is pre-computed for each network repair address.

22. A computer readable non-transitory storage medium as claimed in claim 20 in which the repair path is pre-computed for each network repair address to which multicast data is sent by the repairing node when available.

23. A computer readable non-transitory storage medium as claimed in claim 20 in which the network repair address is for use in the event of non-availability of a component comprising an adjacent node or link to the repairing node.

24. An apparatus for constructing a repair path for multicast data around a non-available component in a data communications network having as components nodes and links therebetween comprising:
 at each repairing node in the data communications network:
  for each notifying node in the data communications network that is not the repairing node:
   while the notifying node is still available:
    means for receiving, from the notifying node in the data communication network, a notification identifying the notifying node and a set of all components that are adjacent to the notifying node and through which the notifying node is reachable;
    for each component from the set of all components that are adjacent to the notifying node and through which the notifying node is reachable:
     means for deriving from the notification, a network repair address for use in the event of non-availability of the component identified in the notification; and
     means for constructing a repair path for the component identified in the notification for multicast data for use in the event of non-availability of the component identified in the notification using the repair address from the notification.

25. An apparatus as claimed in claim 24 in which the repair path is pre-computed for each network repair address.

26. An apparatus as claimed in claim 24 in which the repair path is pre-computed for each network repair address to which multicast data is sent by the repairing node when available.

27. An apparatus as claimed in claim 24 in which the network repair address is for use in the event of non-availability of a component comprising an adjacent node or link to the repairing node.

28. An apparatus for constructing a repair path for multicast data around a non-available component in a data communications network, the apparatus comprising:
 one or more processors;
 a data communication network communicatively coupled to the processor and configured to communicate one or more packet flows among the processor and the data communication network; and
 a computer readable storage medium comprising one or more sequences of instructions for generating routing information which instructions, when executed by one or more processors, cause the one or more processors to perform:
  at each repairing node in the data communications network:
   for each notifying node in the data communications network that is not the repairing node:
    while the notifying node is still available:
     receiving, from the notifying node in the data communication network, a notification identifying the notifying node and a set of all components that are adjacent to the notifying node and through which the notifying node is reachable;
     for each component from the set of all components that are adjacent to the notifying node and through which the notifying node is reachable:
      deriving, from the notification, a network repair address for use in the event of non-availability of the component identified in the notification; and
      using the repair address from the notification, constructing a repair path for the component identified in the notification for multicast data for use in the event of non-availability of the component identified in the notification.

29. An apparatus as claimed in claim 28 in which the repair path is pre-computed for each network repair address.

30. An apparatus as claimed in claim 28 in which the repair path is pre-computed for each network repair address to which multicast data is sent by the repairing node when available.

31. An apparatus as claimed in claim 28 in which the network repair address is for use in the event of non-availability of a component comprising an adjacent node or link to the repairing node.

* * * * *